Nov. 2, 1948.　　L. W. KEMPF ET AL　　2,452,855
MOLD FOR MAKING CASTINGS

Filed Jan. 6, 1943　　　　　　　　　　4 Sheets-Sheet 1

INVENTORS
LOUIS W. KEMPF
LAVERNE W. EASTWOOD
BY George B. Todd
ATTORNEY

Nov. 2, 1948.  L. W. KEMPF ET AL  2,452,855
MOLD FOR MAKING CASTINGS
Filed Jan. 6, 1943  4 Sheets-Sheet 3

INVENTOR.
LOUIS W. KEMPF
LAVERNE W. EASTWOOD
BY George B. Todd
ATTORNEY

Nov. 2, 1948.                L. W. KEMPF ET AL                2,452,855
                           MOLD FOR MAKING CASTINGS
Filed Jan. 6, 1943                                         4 Sheets-Sheet 4
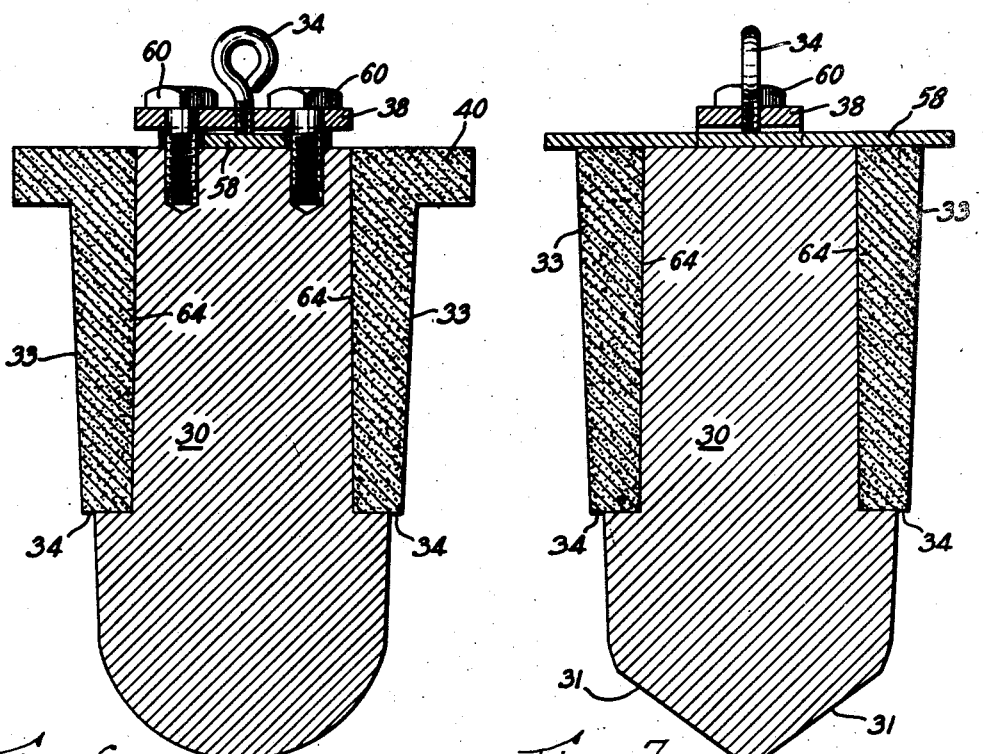
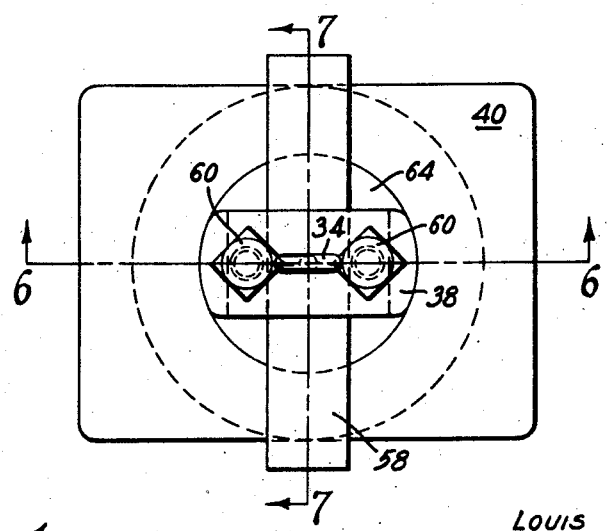
INVENTORS
LOUIS W. KEMPF
LAVERNE W. EASTWOOD
BY George B. Todd
ATTORNEY Patented Nov. 2, 1948

2,452,855

UNITED STATES PATENT OFFICE 2,452,855

MOLD FOR MAKING CASTINGS

Louis W. Kempf, Lakewood, and La Verne W. Eastwood, University Heights, Ohio, assignors to Aluminum Company of America, Pittsburgh, Pa., a corporation of Pennsylvania Application January 6, 1943, Serial No. 471,414

2 Claims. (Cl. 22—131)

This invention, in general, relates to making castings from light metal alloys, and it is more particularly concerned with the manufacture of castings of the type represented by finned cylinder heads for air-cooled motors. By light metal alloys is meant alloys wherein such metals as aluminum or magnesium form the major component.

In making castings having hollow spaces therein, the mold assembly employed generally consists of two parts, the outer portion which defines the external surface of the casting, which for convenience may be referred to as the external mold, and a core portion which defines the internal surface of the casting. The external mold and core may be composed entirely of sand or an equivalent substance, in which case the mold assembly is referred to as a sand mold. The external mold and core may also be made entirely of metal, thus eliminating the destruction of any part of the mold assembly after a casting has been made therein and permitting the making of successive castings merely by assembling the several parts in their proper relationship. Such molds are referred to as permanent molds. On the other hand, where the external mold is made of metal and the core consists of sand or a similar substance, the mold assembly is usually referred to as a semi-permanent mold. The reverse practice of using an external sand mold and a solid metal core is not employed commercially in making light metal alloy castings of any considerable size because of difficulties in accurately positioning the core and properly feeding molten metal to the casting. This is especially true in making castings of a hollow cylindrical shape or having substantial portions thereof of such shape, as in the case of air-cooled motor cylinder heads.

The casting of finned aluminum base alloy cylinder heads for air-cooled motors has been a particularly difficult problem because of the complexity of the article, the combination of light and heavy sections and the difficulty of properly feeding molten metal to the several portions of the casting to avoid internal shrinkage. It has been found that a sand mold assembly with the conventional small sand chills in the rocker boxes and similar locations provided the best type of mold in view of all factors, although many rejections of cast heads are still encountered because of commercial foundry handling operations. While the cylinder heads which have passed inspection have been satisfactory in the past, the increased demand for more power in the motors has called for heads of even higher quality and this has necessitated a search for better molds and methods for casting cylinder heads. In particular, it has been found that the inside of the dome of the casting which forms a portion of the combustion chamber in the motor must possess a denser, sounder structure than in the past if additional power is to be gained without failure of that portion of the casting.

Accordingly, it is an object of this invention to provide a means of casting hollow cylindrically shaped articles of light metal alloys having a dense sound structure, especially over a considerable portion of the internal surface. A particular object is to provide a mold and a method for making cast aluminum base alloy finned cylinder heads for air-cooled motors. A further object is to provide a method of employing a center core chill in forming the dome of such cylinder heads without misalignment of the chill and with adequate feeding of molten metal to all parts of the casting. Still another object of the invention is to provide a means for minimizing, if not eliminating, the deleterious effect of dross in the dome portion of the cylinder head casting. Another object is to provide a method and means for adequately filling the fins of an air-cooled cylinder head.

Our invention is predicated on the discovery that high quality hollow cylindrically shaped castings, particularly those having variable thickness of section or having one end open and the other closed, can be made by using a solid block of metal or its equivalent as a core, feeding the molten metal at the bottom of the mold cavity below the lowest portion of the core, and filling the mold cavity against a temporary air pressure in excess of that outside of the mold. To minimize or eliminate the accumulation of dross and resultant porosity of the casting, especially at cope surfaces, a substance should be released at or close to the bottom of the mold cavity which alters the surface characteristics of the liquid metal, thereby causing the dross and any gas bubbles to collapse. The use of a large center core chill requires a different system of supplying molten metal to the mold cavity and introduces other problems not found where a sand core is employed. Our invention is directed to overcoming the difficulties associated with the use of a metal core in making castings of the kind herein described. In making cylinder heads of the kind described hereinabove, for example, the closed end or head should form the bottom of the casting with the open end at the top. The solid metal core is introduced through the open end of the casting and is centered within the cylinder barrel in a manner more fully described hereinbelow and a suitable closure is provided at the top of the casting which partially seals the mold cavity against escape of air therefrom as it is filled with molten metal. The metal is fed to the bottom of the mold cavity at or below the lowest point of the core chill and for this reason the casting is regarded as being bottom poured with respect to the core. In some instances it may be desirable to provide additional gates at a higher level, but in any event the first metal to enter the mold cavity should come through the lowest gate. In our preferred practice a capsule of a volatile substance is placed at the bottom of the pouring sprue and at the lowest gate to the mold cavity, which melts on contact with the molten metal and releases the substance contained therein that in turn vaporizes and affects the surface characteristics of the liquid metal so that few if any bubbles of air or other gas remain in the metal or in the dross when freezing is completed. We have found that cylinder heads cast in the foregoing manner possess a denser and sounder structure over a substantial portion of the internal surface of the head forming the combustion chamber than the heads made in the usual sand mold assembly. Tensile test specimens cut from this region have indicated a tensile strength of as much as 30 per cent above that of similar specimens taken from sand cast heads. The undissolved alloy constituents in such a core chilled head occur as finely divided particles instead of the coarse particles found in sand cast heads.

The use of a solid metal center core chill does not, of course, displace small sand cores employed in forming minor hollow portions of a casting. The solid metal core which we employ is not to be confused with the small chills frequently used in sand molds since the core is either a single block of metal or composed of metal sections which fit together and form what is known as a collapsible core. The desired chilling effect is accomplished by having a large mass of metal behind the surface of the chill exposed to the molten metal rather than by relatively small pieces of metal imbedded in a green sand mold or baked sand core. One of the advantages of employing a solid metal core is that since it is one of the last pieces of the mold assembly to be put in place it is possible to inspect the mold cavity shortly before molten metal is introduced therein and thus reduces to a minimum the use of defective and dirty molds.

Where the solid metal core described hereinabove is employed, it is necessary to remove it shortly after the surrounding metal has solidified. Otherwise the casting would shrink upon the core with consequent loss of both casting and core. The removal of metal cores from castings in this manner is a common practice in the permanent mold casting art and hence presents no new operation to the foundry workman.

In our preferred practice the molten metal is introduced to the mold cavity through two pouring sprues located on opposite sides of the casting through any suitable location in the lower part of the head. To facilitate filling of the mold cavity with metal, it is advisable to employ a pouring basin described hereinbelow and shown in the accompanying Fig. 3. The outlets from the basin extend into the pouring sprues. The molten metal descends through the sprues and gates and surges upwardly into the mold cavity. Inasmuch as no direct opening or riser to the outside atmosphere is provided at the top of the casting and the mold cavity is partially sealed by the tight fit between the core and external mold, a cushion of air is produced by the sudden influx of metal, the air pressure thus created being in excess of that outside of the mold. This air pressure forces the molten metal out laterally into the remote portions of the mold cavity. In the case of finned cylinder heads, the molten metal is forced out to the edges of the fins, thus filling them. Under previous attempts to utilize bottom pouring, the filling of the fins has presented a considerable problem, particularly fins in certain locations. The creation of an air pressure in the mold cavity as mentioned above has overcome this difficulty, or at least materially reduced it.

The partial seal against the escape of air at the top of the casting should not be tight enough to retain for a long period of time the air pressure created by the inflow of molten metal but should permit return to the atmospheric pressure existing outside of the mold as the level of the metal reaches the top of the mold cavity for otherwise an undesirable amount of air would be trapped and might be forced back into the metal and produce voids and pores. The space between the core and the external mold together with the natural permeability of the sand mold provides for an escape of the air. The air pressure which is useful in causing a filling of the more remote and thin sections of the casting is therefore only temporary, lasting for a matter of a few seconds.

In the normal course of introducing molten metal into a mold and in the filling thereof, some dross, oxide film, and even air bubbles are generally carried with the metal. There is a tendency for this dross and bubbles to collect on the upper surface of the molten metal next to cope surfaces in the mold cavity, thus causing porosity and an inclusion of non-metallic particles. This may lead to rejection of the castings if the unsoundness extends far enough into the surface. It has been found that this trouble can be overcome by placing a substance in the pouring sprue at the lowest gate to the mold cavity which vaporizes in contact with the molten metal and changes the surface characteristics of the metal so that any bubbles formed by gas in the metal or dross are quickly collapsed. It has been discovered that silicon tetrachloride is such a substance and that by providing 1 to 2 ccs. of this material in the capsule placed at the bottom of each of the pouring sprues in the cylinder head mold very little, if any, porosity occurs in the dome or other cope surfaces of the casting because of dross or gas bubbles. Other substances than silicon tetrachloride may be employed providing that they exhibit the same characteristics.

To further illustrate the method of making castings described hereinabove and to show an embodiment of a mold which forms a part of the invention, the accompanying figures are shown in which like numerals refer to like parts in every figure.

Fig. 6 is a vertical section of the metal core with surrounding sand sleeve in place taken on line 6—6 of Fig. 8;

Fig. 7 is another view of the core and sleeve taken on line 7—7 of Fig. 8; and

Fig. 8 is a plan view of the metal core and means for supporting and withdrawing the same.

Figure 1:
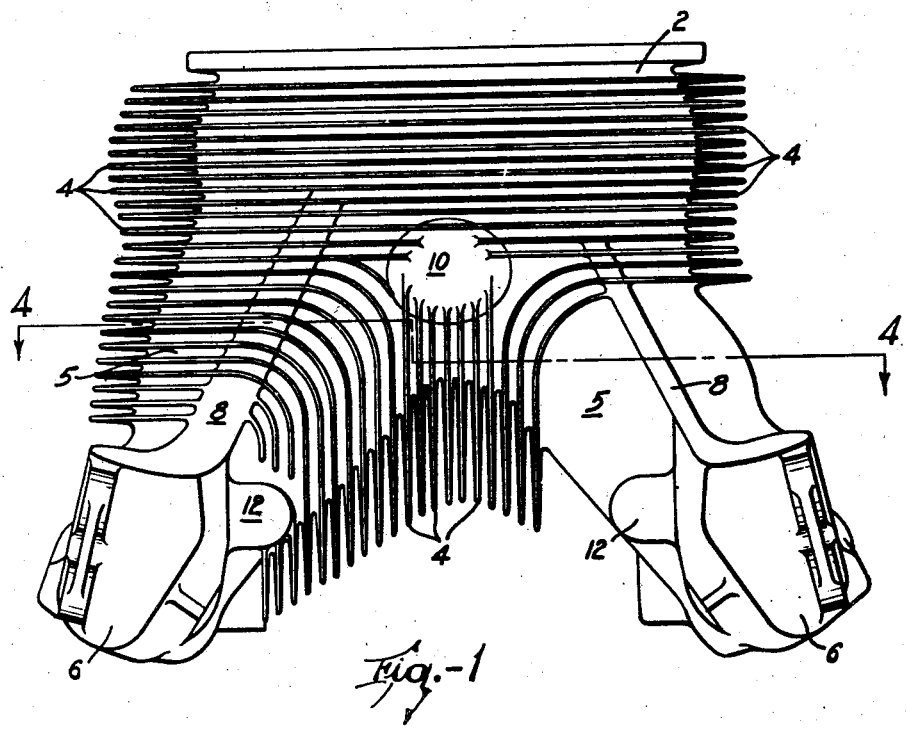
Fig. 1 is an elevational view of a finished cylinder head casting prior to any machining operations.
Figure 2:
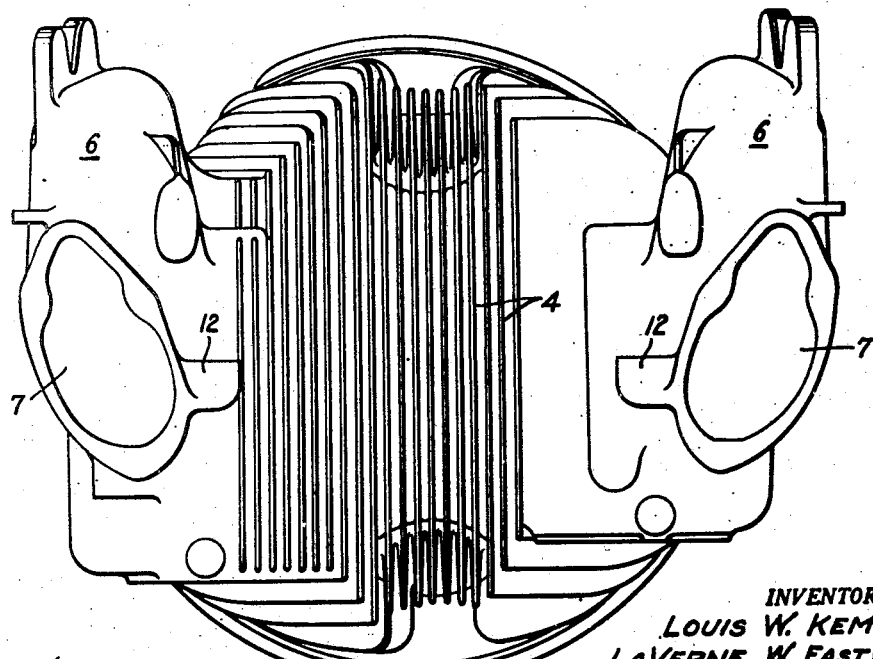
Fig. 2 shows a plan view of the same finished cylinder head.

In Fig. 1 a conventional finished cylinder head prior to any machining operation is shown in an inverted position to illustrate the position in which it is cast. The barrel 2 of the cylinder is surrounded by fins 4 some of which also pass over the top of the head. Extending out from the barrel are the exhaust and intake ports 5 and their rocker arm boxes 6 with supporting webs 8. The spark plug boss is located at the point 10 in the head while the oil line bosses are provided at 12. A plan view of the same cylinder head is shown in Fig. 2 which shows the openings 7 in the rocker arm boxes 6. These views well illustrate the intricacy of the external surface of the casting.

Figure 3:
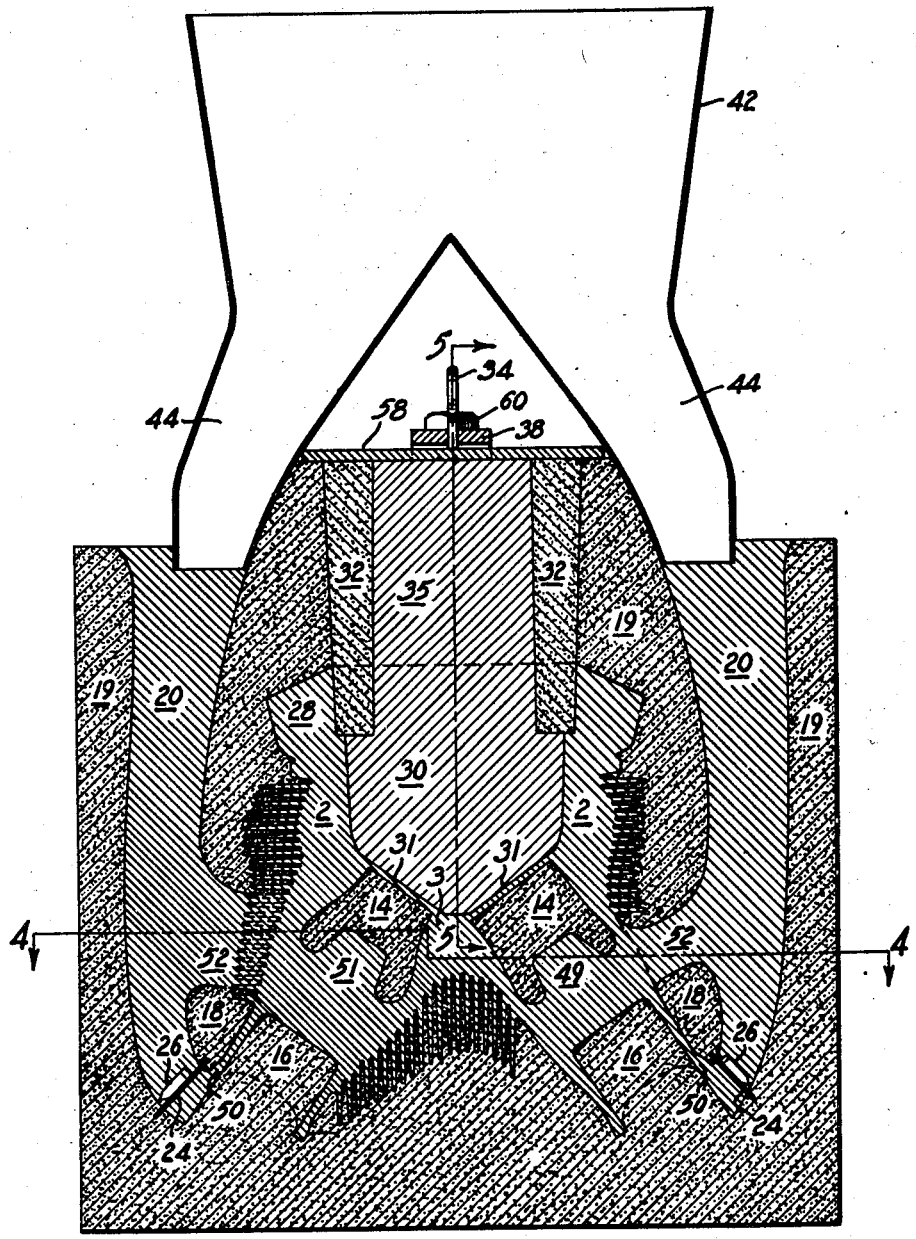
Fig. 3 is a cross sectional view in a vertical plane of a cast cylinder head in pouring position in a mold and pouring basin on top of the mold.

The manner in which the cylinder head is gated and the several cores are located is shown in Fig. 3 in a vertical cross section of the mold assembly and casting in the mold taken on the parting line of the mold, i. e. the vertical plane in which the two halves of the external sand mold meet. The external sand mold 19 which is generally made of a baked sand mixture surrounds the casting. The molten metal comes down from pouring basin 42 through legs 44 to the vertical pouring sprues 20. The sprues terminate at gates 50 disposed adjacent the boss section of the rocker arm boxes 6 and at port risers 52. The mold section 18 is joined to the external mold and is not a core section. The casting is thus fed through the gates 50 adjacent the rocker boxes and through the port risers 52 at the level of the intake valve guide boss 49 and exhaust valve guide boss 51, all of which are below the lowest point of the center core chill. Gating in this casting in this manner is necessary in view of the heavy chilling effect of the center core and the necessity for providing a sufficient amount of metal to the heavy valve guide boss sections. In front of gates 50 are located screens 24 which become imbedded in the metal when it freezes. The screens, of course, serve to prevent coarse particles from entering the mold cavity. For purposes of illustration, capsules of silicon tetrachloride 26 are shown resting on the screens as they appear prior to introduction of the molten metal. The port cores 14 and rocker arm cores 16, which are made of sand, indicate the complexity of the coring within a cylinder head casting and the problem of properly feeding light and heavy sections near a heavy chill. The dome portion 3 of the casting is formed below the hemispherical head of the metal center core chill 30 while the barrel 2 of the combustion chamber surrounds this core. The portions of the head which form the combustion chamber are thus chilled by the core. Excess metal for feeding the barrel portion of the casting during freezing comes from ring riser 28 which is subsequently trimmed off the casting. The metal center core 30 has two flat surfaces 31 opposite cores 14 on an otherwise hemispherical head to provide proper contour for the intake and exhaust valve seats in the finished product.

The upper portion or stem 35 of the center metal core does not come in contact with the molten metal since it is surrounded by a sleeve 32 of baked sand or similar refractory material which assists in aligning the core with respect to the mold cavity, as more fully described hereinbelow. The sleeve 32 also serves to reduce the rate of cooling of metal in the ring riser 28 and thus promotes a better feeding of the casting. The sleeve does not, of course, interfere with the chilling of the dome and barrel since it is above that portion of the casting.

A fixture is attached to the top of the center core chill 30 for handling and supporting it in the mold. The fixture may suitably comprise an eye bolt 34 screwed into plate 38 which is secured in spaced relation to the top of the core by stud bolts 60 that extend through suitable spacing sleeves or washers. Between plate 38 and the top of the core stem 35 is a removable bar 58 that is thrust endwise into position when the core is lowered into the mold cavity or may be placed in position before the core is located in the mold assembly. The bar is long enough to extend across the top of the sand sleeve and rest upon the external mold, thus supporting the core at the desired elevation. The bar is held in fixed position by screwing down either the eye bolt or the stud bolts.

Figure 4:
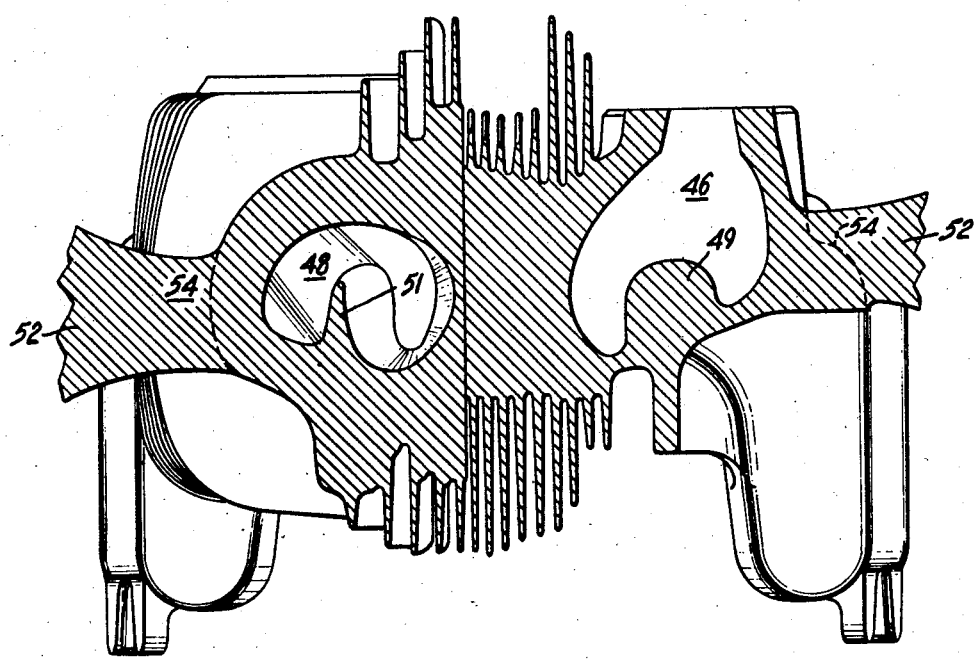
Fig. 4 is a cross section taken on line 4—4 of Fig. 1.

The feeding of the cylinder head at the level of the port risers 52 is shown in detail in Fig. 4 where they enter the intake and exhaust valve guide boss sections 51 and 49, respectively, of Fig. 3. The difficulty of properly feeding such sections of variable size will be appreciated by those skilled in the art and as well the necessity for supplying an adequate amount of molten metal to these sections during freezing of the metal. Another reason for introducing the molten metal at this location is to avoid undue machining costs in finishing operations. It is evident that the fins formed at the port risers can be readily removed by machining the convex external surface 54. The relationship of these guide boss sections to the external contour of the head at these sections is also illustrated by Fig. 4. The cavity forming the intake port is shown at 46 and the exhaust port cavity is identified by 48.

Figure 5:
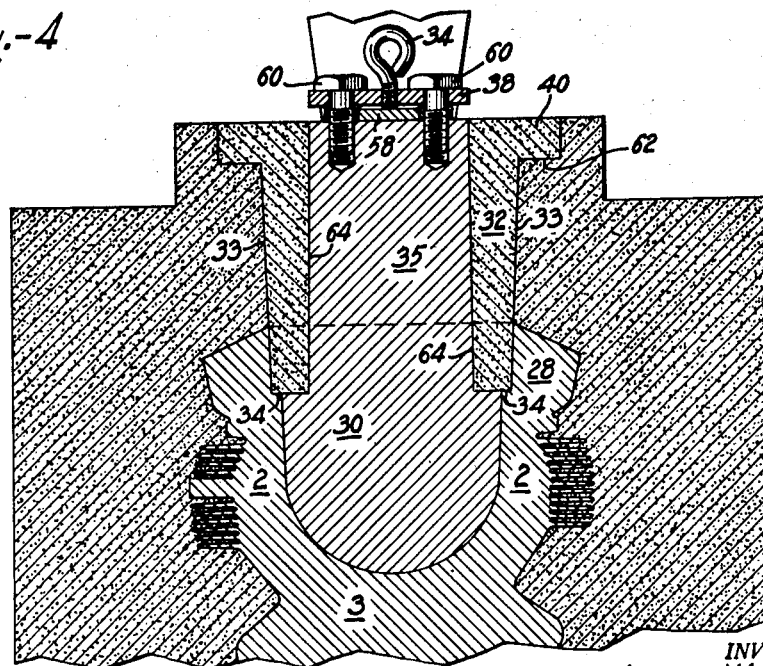
Fig. 5 is a view of the metal core and surrounding sleeve in position in the mold taken on line 5—5 of Fig. 3.

The manner of seating the metal center core in the mold is illustrated in Fig. 5. The stem 35 of the core 30 is of reduced diameter to receive the sand sleeve 32, the stem portion being slightly tapered inwardly toward the top of the core. The sand sleeve 32 completely surrounds the stem 35 of the metal core 30, the outside diameter being greater than the maximum diameter of the metal core below the stem portion, thus producing a shoulder 34 which facilitates subsequent trimming operations on the casting. The outside surface 33 of the sleeve 32 is tapered outwardly from the bottom to the top to conform to the opening or central aperture in the external sand mold. At the top of the sleeve and integral therewith is a rectangular print 40, better shown in Figs. 7 and 8, which is accommodated in a recess 62 formed in the top of the mold and assists in aligning and supporting the sand sleeve in the mold. In making the sand sleeve, its internal diameter should be slightly less than that of the core stem 35 so that the sleeve must be worked down onto the core to produce a snug fit. When the bar 58 has been put in place and the eye bolt screwed down, the core and sleeve are placed in the mold, or, as previously mentioned, the bar may be positioned when the core is lowered into the mold cavity. The bar serves both to support the metal core and prevent the sand sleeve from loosening when the molten metal is introduced into the mold cavity.

The tapered surface of the positioned sand sleeve both with respect to the metal center core and the mold is best illustrated in Figs. 6 and 7, and the assembled relation in the mold in Figs. 3 and 5. By means of the tapered shape of the sand sleeve and the use of the rectangular print, it is possible to accurately locate the core both with respect to elevation and center of the cylinder barrel. Furthermore, by establishing such a close fit between the center core, sleeve and mold, a sufficiently tight joint is made to partially seal the mold cavity and prevent an immediate or free escape of air from the mold cavity when the molten metal is introduced therein. Rejections of castings because of misplacement of the center cores can be almost entirely eliminated by means of the foregoing arrangement of mold parts. Moreover, the assembling operations are so simple that any workman can seat the core without the use of gauges or other tools for determination of clearances. The relationship of the rectangular print 40 to the sand sleeve 32 is also illustrated in Figs. 6 and 7. The width of the print, it will be noted, is equal to the outside diameter of the sleeve while the length of the print exceeds the diameter. The bar 58 preferably crosses the print on its smaller dimension.

The metal core chill should be made from a metal having a relatively high thermal conductivity in order to achieve the greatest benefit from chilling. Such metals as copper, or aluminum or their alloys are preferred.

Although the various steps in assembling the mold and pouring the casting have been separately described above, for the sake of clarity the assembly of the entire mold and the subsequent casting operations will be outlined in the order in which they are carried out in a foundry. In assembling the mold halves, screens are placed in front of the lowest gate. An ordinary iron wire screen is suitable for this purpose. After the external sand mold has been assembled together with the small cores and chills and the mold halves cemented together, capsules of silicon tetrachloride are placed on the screens and the mold cavity is examined for any flaws or pieces of loose sand which may have fallen into the cavity. The presence of the central opening in the mold facilitates this inspection. When the mold has passed inspection, the metal core with baked sand sleeve previously fitted thereon is set into position and the supporting print is positioned in the recess provided for it on top of the mold. The pouring basin is then placed in position and the molten metal at a temperature of from 1400 to 1450° F. is rapidly poured into the basin from the usual type of pouring ladle. The molten metal quickly passes down the sprues and into the mold cavity together with the vaporized silicon tetrachloride with the result that a temporary cushion of slightly compressed air is created above the molten metal. As the metal continues to rise, the air pressure is dissipated and returns to normal, that is, the pressure becomes equal to that outside of the mold. Within 4 or 5 minutes after the pouring has been completed, the pouring basin, the metal core and sleeve are withdrawn, thus exposing the dome and cylinder walls to the atmosphere. Additional cooling is thus effected as compared to sections of the casting completely surrounded by sand. After the entire casting has cooled below the temperature where distortion will occur because of softness of the metal, the casting is shaken out of the mold and the sand cores knocked out in the usual manner.

A variety of light metal alloys may be cast in the type of mold mentioned hereinabove; however, for cylinder heads and castings of a similar nature designed for service at an elevated temperature, certain alloys must be employed. An aluminum base alloy composed chiefly of 4 per cent copper, 1.5 per cent magnesium, 2 per cent nickel and balance aluminum is frequently used for this purpose.

In referring to hollow cylindrically shaped castings as being the type of casting to be made in the mold and by the method hereindescribed, it is to be understood that the casting need not be a perfect cylinder or that the entire casting should be substantially cylindrical, but rather that the portion of the casting to be chilled by the metal core should be of such a shape as to permit introduction and withdrawal thereof without disturbing the balance of the casting or mold. In general, a hollow space having a circular, curved or polygonal cross section extending to the exterior of the casting thus forming a substantially cup-shaped cavity, is adapted to be chilled by a core of the type referred to hereinabove. For the sake of convenience, therefore, castings having this feature are considered to be of a hollow cylindrical shape. If the cup-shaped cavity has undercut portions, it may be necessary to employ collapsible or sectional metal cores; however, such cores are considered to be equivalent to the solid core described hereinabove for the purposes of this invention.

Although certain embodiments of our invention have been described, it is to be understood that it is not to be limited to such embodiments but is applicable to other molds and casting practices.

We claim:

1. A mold assembly for making bottom poured aluminum base alloy finned cylinder heads having rocker boxes and risers at the exhaust and intake ports comprising an external sand mold body having a central opening therein extending from the mold cavity to the top exterior of the mold, a metal core vertically positioned in said opening and forming a chill for the dome and barrel of the cylinder head, said core being supported by means across the top of the central opening, a refractory sleeve snugly fitted between the stem portion of said core and the walls of said opening and extending downwardly into the top of the mold cavity, said sleeve having upwardly and outwardly tapering external surfaces from the bottom to the top thereof cooperating with corresponding surfaces of the walls of the central opening whereby the core is maintained in position with respect to the walls of said central opening and the mold cavity is partially sealed against escape of air therefrom when the molten metal is introduced therein, a print at the top of said sleeve and integral therewith having one lateral dimension greater than the maximum lateral dimension of the sleeve and a recess in the top surface of the external mold for receiving said print whereby the sleeve is maintained in predetermined elevational position with respect to the metal core and mold cavity, a ring riser above and communicating with the barrel portion of the cylinder head, said ring riser having no outlet for molten metal to the external surface of the mold assembly, the lowest portion of the sleeve forming a portion of the wall of said ring riser thereby reducing the chilling of the molten metal therein by the core stem, gates to the rocker boxes and port risers below the level of the lowest part of the metal core, and screens located in the gate sections, and a pouring basin above the external mold having a plurality of outlets leading to and registering with the several pouring sprues in the external mold.

2. A mold assembly for making from a light metal alloy a hollow cylindrically shaped casting closed at one end, comprising an external sand mold body closed at the bottom and having a mold cavity therein and a central opening extending upwardly from said cavity to the top surface of said mold body of sufficient size to permit the insertion and removal of a core, a metal core consisting of a portion within the mold cavity and a stem portion extending outside of said cavity, and a refractory sleeve snugly fitted between the stem portion of said core and the walls of the central opening and extending downwardly into the mold cavity whereby the core is aligned and supported in predetermined position and the mold cavity partially sealed against escape of air therefrom during the filling of said cavity with molten metal, said mold cavity being gated below the level of the lowest portion of the metal core, and having a blind riser at the top of said cavity, the portion of the sleeve extending into the mold cavity forming one wall of said riser.

LOUIS W. KEMPF.
LA VERNE W. EASTWOOD.

REFERENCES CITED

The following references are of record in the file of this patent:

UNITED STATES PATENTS

| Number | Name | Date |
|---|---|---|
| 246,694 | Tellander | Sept. 6, 1881 |
| 345,455 | Stanert | July 13, 1886 |
| 404,889 | Birkholz | June 11, 1889 |
| 486,327 | Cushing | Nov. 15, 1892 |
| 1,011,430 | Henry | Dec. 12, 1911 |
| 1,645,726 | Vaughan | Oct. 18, 1927 |
| 2,101,044 | Blettner | Dec. 7, 1937 |
| 2,253,903 | Hagemeyer | Aug. 26, 1941 |
| 2,314,342 | Campbell | Mar. 23, 1943 |